US010431082B2

(12) United States Patent
Yaldo et al.

(10) Patent No.: US 10,431,082 B2
(45) Date of Patent: Oct. 1, 2019

(54) SYSTEMS AND METHODS FOR EMERGENCY VEHICLE RESPONSE IN AN AUTONOMOUS VEHICLE

(71) Applicant: GM GLOBAL TECHNOLOGY OPERATIONS LLC, Detroit, MI (US)

(72) Inventors: Valor Yaldo, West Bloomfield, MI (US); Xiaofeng F. Song, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 248 days.

(21) Appl. No.: 15/627,304

(22) Filed: Jun. 19, 2017

(65) Prior Publication Data

US 2018/0364732 A1    Dec. 20, 2018

(51) Int. Cl.
| | |
|---|---|
| *G08G 1/0965* | (2006.01) |
| *G05D 1/02* | (2006.01) |
| *G06T 7/90* | (2017.01) |
| *G05D 1/00* | (2006.01) |
| *B60W 30/00* | (2006.01) |
| *G08G 1/017* | (2006.01) |
| *H04N 7/18* | (2006.01) |
| *G06K 9/00* | (2006.01) |
| *G06K 9/46* | (2006.01) |

(52) U.S. Cl.
CPC .......... *G08G 1/0965* (2013.01); *B60W 30/00* (2013.01); *G05D 1/0027* (2013.01); *G05D 1/0246* (2013.01); *G05D 1/0287* (2013.01); *G06T 7/90* (2017.01); *G08G 1/0175* (2013.01); *G05D 2201/0213* (2013.01); *G06K 9/00791* (2013.01); *G06K 9/4652* (2013.01); *G06K 2209/23* (2013.01); *G06T 2207/10024* (2013.01); *G06T 2207/30252* (2013.01); *H04N 7/181* (2013.01); *H04R 2499/13* (2013.01)

(58) Field of Classification Search
CPC ... G08G 1/0965; G08G 1/0175; B60W 30/00; G05D 1/0287; G05D 1/0027; G05D 1/0246; G05D 2201/0213; G06T 7/90; G06T 2207/10024; G06T 2207/30252
See application file for complete search history.

(56) References Cited

U.S. PATENT DOCUMENTS

| | | | |
|---|---|---|---|
| 8,849,557 B1* | 9/2014 | Levandowski et al. | ...................... G08G 1/0965 701/300 |
| 9,278,689 B1* | 3/2016 | Delp | .................... G08G 1/0965 |
| 2007/0132608 A1* | 6/2007 | Votaw et al. | ......... G08G 1/0965 340/903 |
| 2015/0161458 A1* | 6/2015 | Agnew et al. | ..... G06K 9/00825 382/104 |

(Continued)

*Primary Examiner* — Dale W Hilgendorf
(74) *Attorney, Agent, or Firm* — Lorenz & Kopf, LLP (57) ABSTRACT

Systems and methods are provided for controlling an autonomous vehicle. In one embodiment, a method includes: receiving image data from a camera device coupled to the autonomous vehicle; computing, by a processor, a value based on the image data; determining, by a processor, an existence of an emergency vehicle based on the computed value; selecting, by a processor, a first control strategy based on the determined existence of an emergency vehicle; and generating, by a processor, at least one signal to autonomously control the autonomous vehicle based on the control strategy.

16 Claims, 5 Drawing Sheets

(56) References Cited

U.S. PATENT DOCUMENTS

2016/0252905 A1* 9/2016 Tian et al. ............ B60W 30/00
  701/23
2018/0048801 A1* 2/2018 Kiser et al. .......... G05D 1/0246
2018/0233047 A1* 8/2018 Mandeville-Clarke ......................
  B60W 30/00

* cited by examiner

SYSTEMS AND METHODS FOR EMERGENCY VEHICLE RESPONSE IN AN AUTONOMOUS VEHICLE

TECHNICAL FIELD

The present disclosure generally relates to autonomous vehicles, and more particularly relates to systems and methods for detecting the presence of an emergency vehicle and autonomously controlling the vehicle based thereon.

INTRODUCTION

An autonomous vehicle is a vehicle that is capable of sensing its environment and navigating with little or no user input. An autonomous vehicle senses its environment using sensing devices such as radar, lidar, image sensors, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle.

Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

In order to fully automate a vehicle, the vehicle must be aware of common signs and signals in the environment and respond thereto. For example, emergency vehicles generate warning sounds and/or visual signals to notify vehicles on the road to pull over. Accordingly, it is desirable to provide systems and methods for detecting the presence of an emergency vehicle and autonomously controlling the vehicle based thereon. Furthermore, other desirable features and characteristics of the present disclosure will become apparent from the subsequent detailed description and the appended claims, taken in conjunction with the accompanying drawings and the foregoing technical field and background.

SUMMARY

Systems and methods are provided for controlling an autonomous vehicle. In one embodiment, a method includes: receiving image data from a camera device coupled to the autonomous vehicle; computing, by a processor, a value based on the image data; determining, by a processor, an existence of an emergency vehicle based on the computed value; selecting, by a processor, a first control strategy based on the determined existence of an emergency vehicle; and generating, by a processor, at least one signal to autonomously control the autonomous vehicle based on the control strategy.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1A:
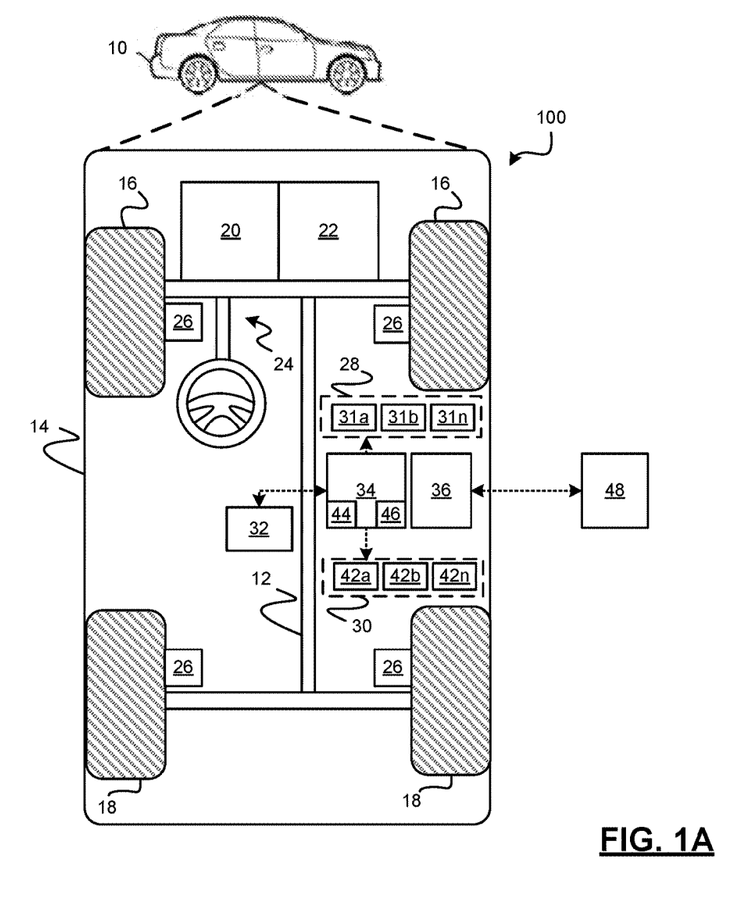
FIG. 1A is a functional block diagram illustrating an autonomous vehicle having a an emergency vehicle detection system, in accordance with various embodiments.

With reference to FIG. 1A, an emergency vehicle detection system shown generally at 100 is associated with a vehicle 10 in accordance with various embodiments. In general, an emergency vehicle detection system 100 receives sensor data from integrated sensors, detects the presence of an emergency vehicle based on the sensor data, generates warning messages about the emergency vehicle and/or controls the vehicle 10 based on the presence of the emergency vehicle.

As depicted in FIG. 1A, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the emergency vehicle detection system 100 is incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 31a-31n that sense observable conditions of the exterior environment and/or the interior environment of the autonomous vehicle 10. The sensing devices 31a-31n can include, but are not limited to, radars, lidars, global positioning systems, optical cameras, thermal cameras, ultrasonic sensors, inertial measurement units, microphones, and/or other sensors. The actuator system 30 includes one or more actuator devices 42a-42n that control one or more vehicle features such as, but not limited to, the propulsion system 20, the transmission system 22, the steering system 24, and the brake system 26. In various embodiments, the vehicle features controlled by the one or more actuator devices 42a-42n can further include interior and/or exterior vehicle features such as, but are not limited to, doors, a trunk, and cabin features such as air, music, lighting, etc. (not numbered).

Figure 1B:
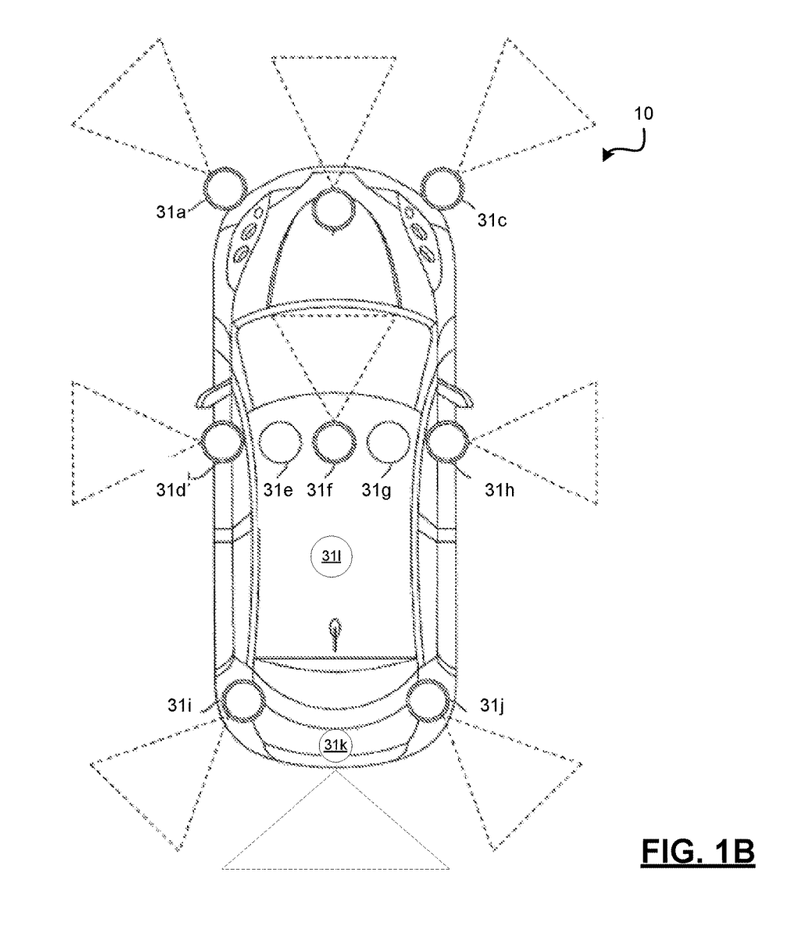
FIG. 1B is an illustration of vehicle cameras of the emergency vehicle detection system distributed about the autonomous vehicle, in accordance with various embodiments.

In various embodiments, one or more of the sensing devices 31a-31n are camera or other imaging devices. The camera devices are coupled to an exterior of the body 14 of the vehicle 10 and/or coupled to an interior of the vehicle 10 such that they may capture images of the environment surrounding the vehicle 10. For example, an exemplary embodiment of sensing devices 31a-31j that include camera devices distributed about the vehicle 10 is shown in FIG. 1B. As shown, sensing devices 31a-31j are disposed at different locations and oriented to sense different portions of the surrounding environment in the vicinity of the vehicle 10. As can be appreciated, the sensing devices 31a-31j can include all of the same type of camera device or be a combination of any of the types of camera devices.

In the provided example, a first sensing device 31a is positioned at the front left (or driver) side of the vehicle 10 and is oriented 45° counterclockwise relative to the longitudinal axis of the vehicle 10 in the forward direction, and another sensor device 31c may be positioned at the front right (or passenger) side of the vehicle 10 and is oriented 45° clockwise relative to the longitudinal axis of the vehicle 10. Additional sensing devices 31i, 31j are positioned at the rear left and right sides of the vehicle 10 and are similarly oriented at 45° counterclockwise and clockwise relative to the vehicle longitudinal axis, along with sensing devices 31d and 31h positioned on the left and right sides of the vehicle 10 and oriented away from the longitudinal axis so as to extend along an axis that is substantially perpendicular to the vehicle longitudinal axis. The illustrated embodiment also includes a group of sensing devices 31e-31g positioned at or near the vehicle longitudinal axis and oriented to provide forward direction signals in line with the vehicle longitudinal axis.

In various embodiments, at least one of the sensing devices 31k is a radar device (e.g., any number of short, mid, and long range radars can be used to measure distances). The radar device 31k is coupled to an exterior of the body 14 of the vehicle 10 and/or coupled to an interior of the vehicle 10 such that it may capture data from the environment surrounding the vehicle 10. Additionally or alternatively, at least one of the sensing devices 31k is a lidar device that measures distance and/or colors. The lidar device is coupled to an exterior of the body 14 such that it captures data from the environment surrounding the vehicle 10.

In various embodiments, at least one of the sensing devices 31l is a microphone or other sound measurement device. The microphone 31l is coupled to an exterior of the body 14 of the vehicle 10 and/or coupled to an interior of the vehicle 10 such that it may capture sound data from the environment surrounding the vehicle 10. In various embodiments, at least one of the sensing devices is a lidar device that With reference now to FIG. 1A, the communication system 36 is configured to wirelessly communicate information to and from other entities 48, such as but not limited to, other vehicles ("V2V" communication), infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC)

channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1A, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the controller 34 are embodied in the emergency vehicle detection system 100 and, when executed by the processor 44, receive image data from the sensing devices 31-31*j* such as the camera devices, process the image data to detect the presence of an emergency vehicle, process data from the sensing device 31*l* (microphone) and/or the sensing device 31*k* (radar sensor) to determine a control strategy, and selectively control the vehicle based on the determined control strategy. In various embodiments, the instructions, when executed by the processor 44 control the vehicle 10 to navigate to the side of the road or other location out of the way of the emergency vehicle.

Figure 2:
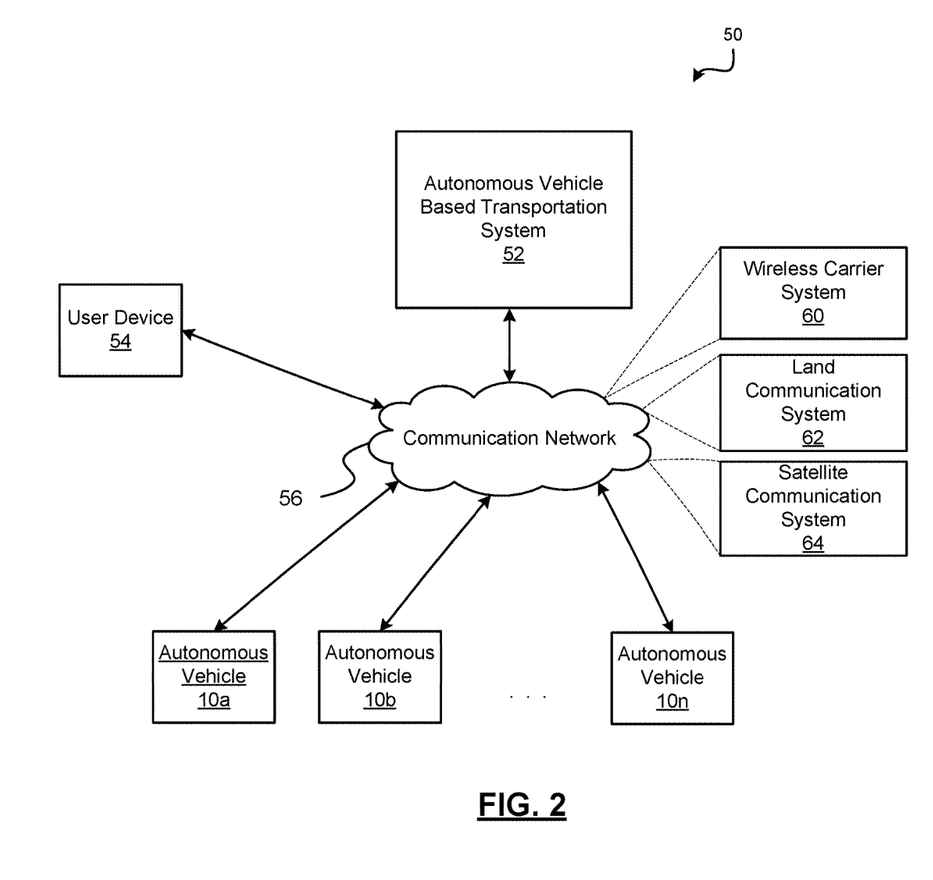
FIG. 2 is a functional block diagram illustrating a transportation system having one or more autonomous vehicles of FIG. 1A, in accordance with various embodiments.

With reference now to FIG. 2, in various embodiments, the autonomous vehicle 10 described with regard to FIG. 1A may be suitable for use in the context of a taxi or shuttle system in a certain geographical area (e.g., a city, a school or business campus, a shopping center, an amusement park, an event center, or the like) or may simply be managed by a remote system. For example, the autonomous vehicle 10 may be associated with an autonomous vehicle based remote transportation system. FIG. 2 illustrates an exemplary embodiment of an operating environment shown generally at 50 that includes an autonomous vehicle based remote transportation system 52 that is associated with one or more autonomous vehicles 10*a*-10*n* as described with regard to FIG. 1A. In various embodiments, the operating environment 50 further includes one or more user devices 54 that communicate with the autonomous vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 can include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10*a*-10*n*. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a piece of home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, which may be cloud-based, network-based, or resident at the particular campus or geographical location serviced by the remote transportation system 52. The remote transportation system 52 can be manned by a live advisor, or an automated advisor, or a combination of both. The remote transportation system 52 can communicate with the user devices 54 and the autonomous vehicles 10*a*-10*n* to schedule rides, dispatch autonomous vehicles 10*a*-10*n*, and the like. In various embodiments, the remote transportation system 52 stores account information such as subscriber authentication information, vehicle identifiers, profile records, behavioral patterns, and other pertinent subscriber information.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the autonomous vehicles 10*a*-10*n* (when and if one is available) to pick up the passenger at the designated pickup location and at the appropriate time. The remote transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline autonomous vehicle 10 and/or an autonomous vehicle based remote transportation system 52. To this end, an autonomous vehicle and autonomous vehicle based remote transportation system can be modified, enhanced, or otherwise supplemented to provide the additional features described in more detail below.

Figure 3:
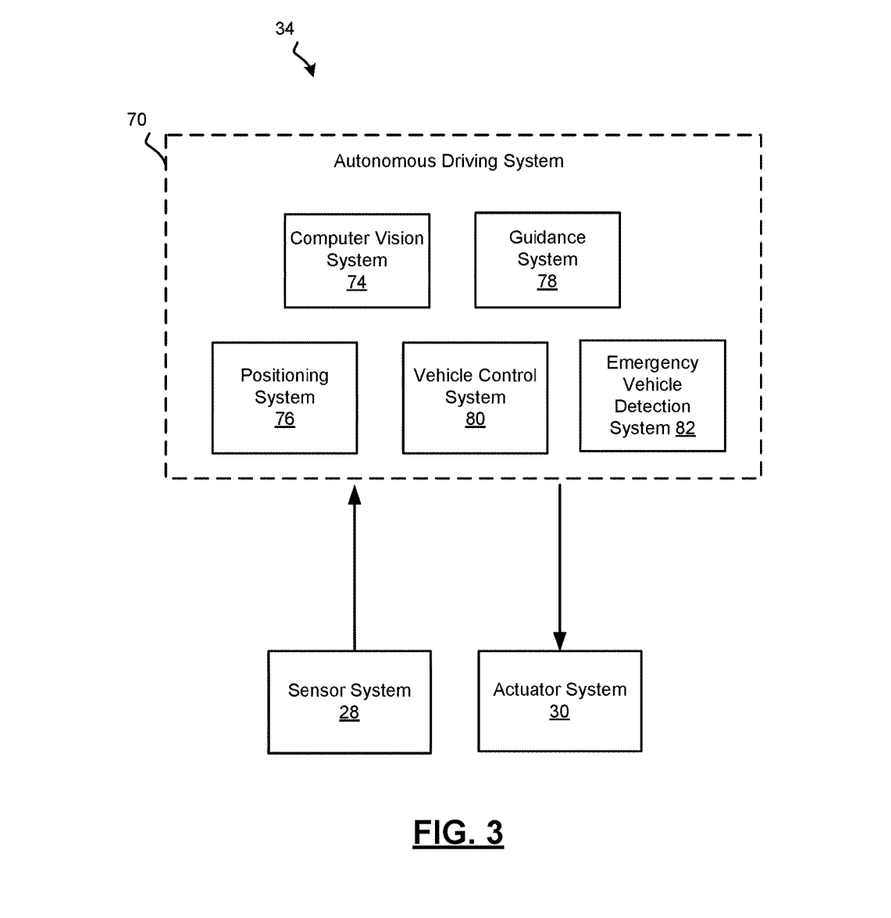
FIG. 3 is a functional block diagram illustrating an autonomous driving system having an emergency vehicle detection system, in accordance with various embodiments.

In accordance with various embodiments, the controller 34 implements an autonomous driving system (ADS) 70 as shown in FIG. 3. That is, suitable software and/or hardware components of controller 34 (e.g., processor 44 and computer-readable storage device 46) are utilized to provide an autonomous driving system 70 that is used in conjunction with vehicle 10.

In various embodiments, the instructions of the autonomous driving system 70 may be organized by function or system. For example, as shown in FIG. 3, the autonomous driving system 70 can include a computer vision system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the computer vision system 74 synthesizes and processes sensor data from the sensing devices 31*a*-31*n* (FIG. 1A) and predicts the presence, location, classification, and/or path of objects and features of the environment of the vehicle 10. In various embodiments, the computer vision system 74 can incorporate information from multiple sensors, including but not limited to cameras, lidars, radars, and/or any number of other types of sensors.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

As mentioned briefly above, a certain portion of the emergency vehicle detection system 100 of FIG. 1 is included within the ADS 70, for example, as the emergency vehicle detection system 82. As can be appreciated, although the emergency vehicle detection system 82 is depicted as a separate system, in various embodiments, all or parts of the emergency vehicle detection system 82 can be integrated into any of the computer vision system 74, the position in system 76, the guidance system 78, and the vehicle control system 80. Provided the example shown in FIG. 3, the emergency vehicle detection system 82 communicates with the computer vision system 74, the guidance system 78, and/or the vehicle control system 80 to receive processed data from the sensor system 28, process image data to determine the presence of an emergency vehicle, process microphone data and/or radar data to confirm a control strategy, and/or control the vehicle 10 based on the determined control strategy.

For example, the computer vision system 74 provides to the emergency vehicle detection system 82 processed sensor data that includes image data combined from the camera devices. In various embodiments, the emergency vehicle detection system 82 processes the image data for the presence of a pattern, for example, of red and blue in frames of the image data (e.g., the presence of the color red in x consecutive frames, and the color blue in y consecutive frames, or any other color combination) determines the presence of an emergency vehicle based on the presence of the pattern. As can be appreciated, other color patterns associated with other emergency vehicles can be detected in various embodiments.

In another example, the computer vision system 74 provides to the emergency vehicle detection system 82 processed radar data that corresponds to the image data. In various embodiments, the emergency vehicle detection system 82 processes the radar data to determine a distance of the object associated with the pattern from the vehicle 10.

In another example, the computer vision system 74 provides to the emergency vehicle detection system 82 processed microphone data that corresponds to the image data. In various embodiments, the emergency vehicle detection system 82 processes the microphone data to determine a distance of the object associated with the pattern from the vehicle 10.

In still another example, the emergency vehicle detection system 82 communicates a control strategy to the guidance system 78. The guidance system 78, in turn, determines a route to the side of the road or out of the way of the emergency vehicle and/or communicates notification messages to the transportation system 52 and/or users of the vehicle 10. In still another example, the emergency vehicle detection system 82 communicates with the vehicle control system 80 directly to control one or more of the actuator devices of the actuator system 30 to cause the vehicle 10 to be controlled such that it autonomously navigates to the side of the road or out of the way of the emergency vehicle. In still another example, the emergency vehicle detection system 82 communicates with the vehicle control system 80 to control one or more actuator devices of the actuator system 30 to cause the vehicle to be controlled such that it autonomously navigates back to the route one the emergency condition has cleared.

Figure 4:
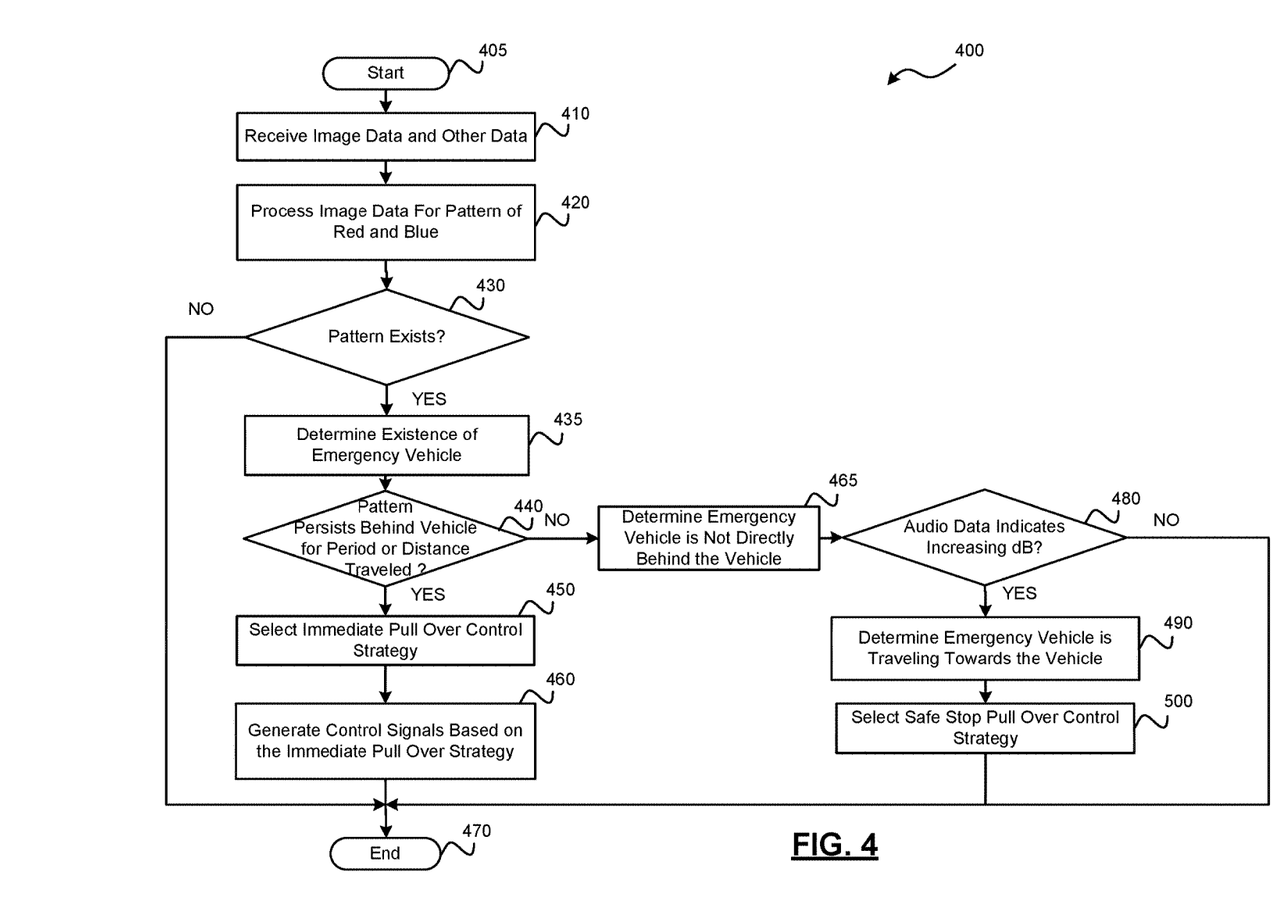
FIG. 4 is a flowchart illustrating a control method for controlling the autonomous vehicle, in accordance with various embodiments.

As shown in more detail with regard to FIG. 4 and with continued reference to FIGS. 1A, 1B, and 3, a flowchart illustrates a control method 400 that can be performed by the emergency vehicle detection system 82 of FIG. 3 in accordance with the present disclosure. As can be appreciated in light of the disclosure, the order of operation within the method is not limited to the sequential execution as illustrated in FIG. 4, but may be performed in one or more varying orders as applicable and in accordance with the present disclosure. In various embodiments, the method 400 can be scheduled to run based on one or more predetermined events, and/or can run continuously during operation of the autonomous vehicle 10.

In one example, the method may begin at 405. Sensor data is received from the camera devices, the microphone, the radar device, and/or the lidar device at 410. The image data or lidar data is processed to determine if a pattern of red and blue color (or other colors having for example a computed RGB value) exists across frames of the data at 420. If the pattern exists at 430, it is determined that an emergency vehicle exists in the field of view of the vehicle 10 at 435. If a pattern does not exist, the method may end at 470.

If a pattern exists and there exists an emergency vehicle at 430 and 435, a control strategy is determined at 440-500.

For example, in various embodiments, the image data is further processed to determine if the pattern exists in an image associated with the environment behind the vehicle 10 (e.g., image data from rear facing camera devices) for a period of time (e.g., a time greater than a predefined threshold) or distance traveled (e.g., distance determined greater than a predefined threshold) at 440, a first pull over control strategy is selected at 450. The first control strategy may, for example, control the vehicle 10 to a stop at a nearest location at the side of the road and remain at the stop until the pattern no longer exists in the field of view. As can be appreciated, other controls strategies may be implemented in various embodiments. Control signals are generated to control one or more of the actuator devices based on the first control strategy at 460. Thereafter, the method may end at 470.

If, at 440, it is determined that pattern exists but not in an image associated with the environment behind the vehicle 10 or for a period of time or distance traveled, it is determined that the emergency vehicle is not directly behind the vehicle 10 at 465. The audio data is then processed to determine the audio data (from the microphone) indicates increasing decibels (dBs) associated within a range associated with a siren sound at 480. If increasing decibels (dBs) associated within a range associated with a siren sound at 480, then it is determined that the emergency vehicle is traveling towards the vehicle 10 at 490; and a second control strategy is selected at 500. The second control strategy may, for example, control the vehicle 10 to a slow or a stop at a location at a side of the road and continue at that the side of the road until the audio data indicates that the decibels are now decreasing. As can be appreciated, other controls strategies may be implemented in various embodiments. Control signals are generated to control one or more actuator devices based on the second control strategy at 500; and the method may end at 470.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of controlling an autonomous vehicle, comprising:

receiving image data from a camera device coupled to the autonomous vehicle;

computing, by a processor, a value based on the image data;

determining, by the processor, an existence of an emergency vehicle based on the computed value;

determining, by the processor, when the emergency vehicle is not traveling behind the autonomous vehicle based on the image data and an environment behind the autonomous vehicle;

when the emergency vehicle is determined to be not traveling behind the autonomous vehicle, receiving audio data from an audio device coupled to the autonomous vehicle;

determining, by the processor, whether the emergency vehicle is traveling towards or away from the autonomous vehicle based on at least one of an increasing and a decreasing of decibels of the audio data;

selecting, by the processor, a first control strategy based on the determined travel of the emergency vehicle; and generating, by the processor, at least one signal to autonomously control the autonomous vehicle based on the first control strategy.

2. The method of claim 1, wherein the computing the value comprises computing a color value based on the image data.

3. The method of claim 2, wherein the color value is a red value or a blue value.

4. The method of claim 2, wherein the computing the value comprises computing a pattern of colors across frames of the image data.

5. The method of claim 4, wherein the colors include red and blue.

6. The method of claim 1, wherein the computing the value comprises computing a pattern of color in an image associated with an environment behind the autonomous vehicle.

7. A system for controlling an autonomous vehicle, comprising:

a non-transitory computer readable medium comprising:

a first module configured to, by a processor, receive image data from a camera device coupled to the autonomous vehicle;

a second module configured to, by the processor, compute a value based on the image data, and determine an existence of an emergency vehicle based on the computed value;

a fifth module that, by the processor, determines when the emergency vehicle is not traveling behind the autonomous vehicle based on the image data and an environment behind the autonomous vehicle, and when the emergency vehicle is determined to be not traveling behind the autonomous vehicle, receives audio data from an audio device coupled to the autonomous vehicle, and determines whether the emergency vehicle is traveling towards or away from the autonomous vehicle based on at least one of an increasing and a decreasing of decibels of the audio data;

a third module configured to, by the processor, select a first control strategy based on the determined travel of the emergency vehicle; and a fourth module configured to, by the processor, generate, at least one signal to autonomously control the autonomous vehicle based on the first control strategy.

8. The system of claim 7, wherein the second module computes the value by computing a color value based on the image data.

9. The system of claim 8, wherein the color value is a red value or a blue value.

10. The system of claim 8, wherein the second module computes the value by computing a pattern of colors across frames of the image data.

11. The system of claim 10, wherein the colors include red and blue.

12. The system of claim 7, wherein the second module computes the value by computing a pattern of color in an image associated with an environment behind the autonomous vehicle.

13. A vehicle, comprising:

a plurality of camera devices distributed about the vehicle, the camera devices sense an environment associated with the vehicle; and a controller that is configured to, by a processor, receive image data from the plurality of camera devices coupled to the vehicle, compute a value based on the image data, determine an existence of an emergency vehicle based on the computed value, determine when the emergency vehicle is not traveling behind the autonomous vehicle based on the image data and an environment behind the autonomous vehicle, and when the emergency vehicle is determined to be not traveling behind the autonomous vehicle, receive audio data from an audio device coupled to the autonomous vehicle, determine whether the emergency vehicle is traveling towards or away from the autonomous vehicle based on at least one of an increasing and a decreasing of decibels of the audio data, select a first control strategy based on the determined travel of the emergency vehicle, and generate, at least one signal to autonomously control the vehicle based on the first control strategy.

14. The vehicle of claim 13, wherein the controller computes a color value as the value based on the image data.

15. The vehicle of claim 14, wherein the color value is red or blue.

16. The vehicle of claim 13, wherein the controller computes a pattern of red and blue.

* * * * *